United States Patent
Onggosanusi et al.

(10) Patent No.: US 9,548,801 B2
(45) Date of Patent: *Jan. 17, 2017

(54) CLOSED LOOP MULTIPLE TRANSMIT, MULTIPLE RECEIVE ANTENNA WIRELESS COMMUNICATION SYSTEM

(75) Inventors: Eko N. Onggosanusi, Dallas, TX (US); Anand G. Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,991

(22) Filed: Sep. 13, 2012

(65) Prior Publication Data

US 2013/0010845 A1    Jan. 10, 2013

Related U.S. Application Data

(63) Continuation of application No. 10/026,278, filed on Dec. 18, 2001, now Pat. No. 8,290,098.

(Continued)

(51) Int. Cl.
| | | |
|---|---|---|
| H03D 1/04 | (2006.01) |
| H04L 27/00 | (2006.01) |
| H04L 27/14 | (2006.01) |
| H04B 7/04 | (2006.01) |
| H04B 7/06 | (2006.01) |
| H04L 1/00 | (2006.01) |

(Continued)

(52) U.S. Cl.
CPC .......... *H04B 7/0417* (2013.01); *H04B 7/0634* (2013.01); *H04L 1/0001* (2013.01); *H04L 1/0025* (2013.01); *H04L 1/0029* (2013.01); *H04L 1/0675* (2013.01); *H04L 25/03343* (2013.01); *H04B 1/7115* (2013.01); *H04B 7/082* (2013.01); *H04B 7/0854* (2013.01); *H04B 2201/70702* (2013.01); *H04L 2025/03375* (2013.01)

(58) Field of Classification Search
USPC ............... 375/130, 135, 136, 137, 140, 146, 147,375/148, 150, 152, 222, 240.1, 240.11,375/240.26–240.29, 299, 316, 324, 326, 340,375/346, 347, 350, 219–221, 229–234, 240.13,375/240.15, 254, 284–285, 295–296, 341, 343,375/358; 370/203, 204, 208, 286, 290, 292, 370/291; 455/500–501, 515, 63.1, 60, 67.13, 455/69, 73, 91, 104, 130
See application file for complete search history.

(56) References Cited

U.S. PATENT DOCUMENTS 5,323,322 A      6/1994  Mueller et al.
6,144,711 A  *  11/2000  Raleigh et al. ............... 375/347
(Continued)

*Primary Examiner* — Linda Wong
(74) *Attorney, Agent, or Firm* — Ronald O. Neerings; Charles A. Brill; Frank D. Cimino

(57) ABSTRACT

A wireless receiver (74) for receiving signals from a transmitter (72). The transmitter comprises a plurality of transmit antennas ($TAT_1'$, $TAT_2'$) for transmitting the signals, which comprise respective independent streams of symbols. Additionally, interference occurs between the respective streams. The receiver comprises a plurality of receive antennas ($RAT_1'$, $RAT_2'$) for receiving the signals as influenced by a channel effect between the receiver and the transmitter. The receiver also comprises circuitry (80) for multiplying the signals times a conjugate transpose of an estimate of the channel effect and times a conjugate transpose of a linear basis transformation matrix. The receiver also comprises circuitry (84) for selecting the linear basis transformation matrix from a finite set of linear basis transformation matrices. Lastly, the receiver comprises circuitry (88) for removing the interference between the respective streams.

17 Claims, 4 Drawing Sheets

Related U.S. Application Data

(60) Provisional application No. 60/280,693, filed on Mar. 30, 2001.

(51) Int. Cl.
  *H04L 1/06* (2006.01)
  *H04L 25/03* (2006.01)
  *H04B 1/7115* (2011.01)
  *H04B 7/08* (2006.01)

(56) References Cited

U.S. PATENT DOCUMENTS

| | | | |
|---|---|---|---|
| 6,192,256 B1 | 2/2001 | Whinnett | |
| 6,259,924 B1 | 7/2001 | Alexander, Jr. et al. | |
| 6,298,092 B1 | 10/2001 | Heath, Jr. et al. | |
| 6,314,125 B1 * | 11/2001 | Shanbhag | H04J 13/0025 370/208 |
| 6,314,147 B1 * | 11/2001 | Liang | H04B 7/0854 375/346 |
| 6,351,499 B1 * | 2/2002 | Paulraj et al. | 375/267 |
| 6,377,636 B1 * | 4/2002 | Paulraj | H04B 7/0842 370/342 |
| 6,392,596 B1 | 5/2002 | Lin et al. | |
| 6,434,366 B1 | 8/2002 | Harrison et al. | |
| 6,452,981 B1 | 9/2002 | Raleigh et al. | |
| 6,560,291 B1 | 5/2003 | Piret et al. | |
| 6,584,302 B1 * | 6/2003 | Hottinen | H04B 7/0619 370/275 |
| 6,593,880 B2 | 7/2003 | Velazquez et al. | |
| 6,594,473 B1 * | 7/2003 | Dabak | H04B 7/061 370/334 |
| 6,621,851 B1 * | 9/2003 | Agee | H04B 1/69 370/242 |
| 6,665,545 B1 | 12/2003 | Raleigh et al. | |
| 6,683,906 B1 | 1/2004 | Iwamatsu | |
| 6,711,209 B1 * | 3/2004 | Lainema | H04N 19/147 348/699 |
| 6,714,584 B1 | 3/2004 | Ishii et al. | |
| 6,724,842 B1 * | 4/2004 | Hochwald | H04L 1/0612 370/334 |
| 6,889,355 B1 | 5/2005 | Calderbank et al. | |
| 6,891,897 B1 | 5/2005 | Bevan et al. | |
| 6,920,191 B2 | 7/2005 | Hafeez et al. | |
| 6,950,401 B2 * | 9/2005 | Rong | H04L 1/0003 370/252 |
| 6,952,454 B1 * | 10/2005 | Jalali et al. | 375/260 |
| 6,970,524 B1 * | 11/2005 | Zeng et al. | 375/347 |
| 6,973,134 B1 * | 12/2005 | Jones, IV | H04L 27/2647 375/260 |
| 6,977,977 B1 * | 12/2005 | Dubrovin | H03D 3/008 375/285 |
| 7,050,510 B2 | 5/2006 | Foschini et al. | |
| 7,286,508 B2 * | 10/2007 | Abeta | H04B 1/692 370/320 |
| 7,299,071 B1 * | 11/2007 | Barratt et al. | 455/562.1 |
| 7,929,592 B1 | 4/2011 | Okumura et al. | |
| 2001/0033622 A1 | 10/2001 | Jongren et al. | |
| 2001/0038356 A1 * | 11/2001 | Frank | 343/853 |
| 2002/0041635 A1 * | 4/2002 | Ma et al. | 375/267 |
| 2002/0051433 A1 | 5/2002 | Affes et al. | |
| 2002/0191703 A1 * | 12/2002 | Ling et al. | 375/267 |
| 2004/0095907 A1 | 5/2004 | Agee et al. | |

* cited by examiner

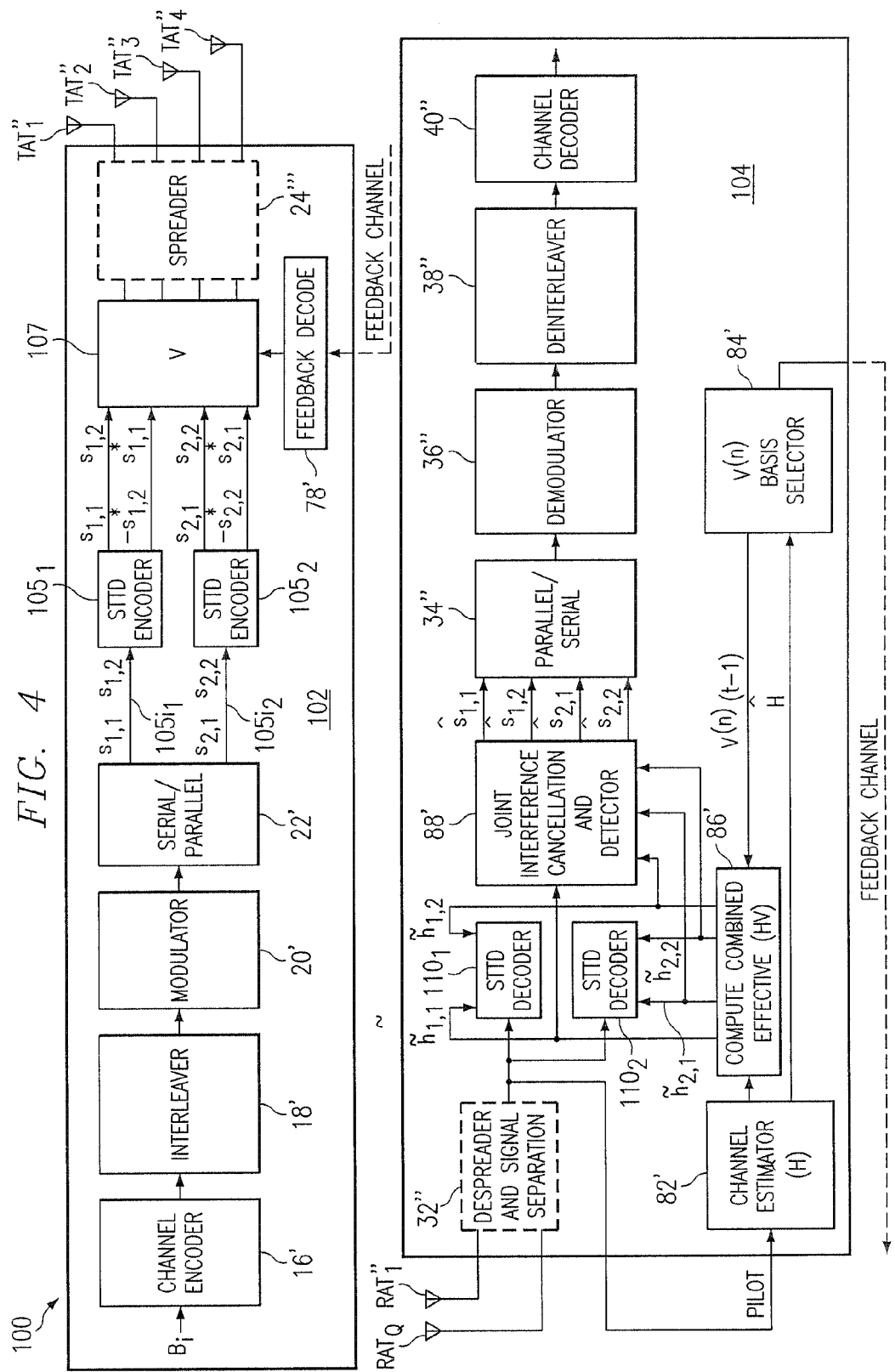

CLOSED LOOP MULTIPLE TRANSMIT, MULTIPLE RECEIVE ANTENNA WIRELESS COMMUNICATION SYSTEM

CROSS-REFERENCES TO RELATED APPLICATIONS

This application is a Continuation of application Ser. No. 10/026,278 filed Dec. 18, 2001 now U.S. Pat. No. 8,290,098, which claims the benefit, under 35 U.S.C. §119(e)(1), of U.S. Provisional Application No. 60/280,693 (TI_32854PS), filed Mar. 30, 2001, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to wireless communications systems and, more particularly, to transmitters and receivers with multiple transmit and multiple receive antennas, respectively.

Wireless communications are prevalent in business, personal, and other applications, and as a result the technology for such communications continues to advance in various areas. One such advancement includes the use of spread spectrum communications, including that of code division multiple access ("CDMA") and wideband code division multiple access ("WCDMA") cellular communications. In such communications, a user station (e.g., a hand held cellular phone) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one being frequency division duplex ("FDD") and another being time division duplex ("TDD"), where the uplink and downlink channels are asymmetric for FDD and symmetric for TDD. Another wireless standard involves time division multiple access ("TDMA") apparatus, which also are used by way of example in cellular systems. TDMA communications are transmitted as a group of packets in a time period, where the time period is divided into slots (i.e., packets) so that multiple receivers may each access meaningful information during a part of that time period. In other words, in a group of receivers, each receiver is designated a slot in the time period, and that slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

Since CDMA and TDMA communications are along wireless media, then the travel of those communications can be affected in many ways, and generally these effects are referred to as the channel effect on the communication. For example, consider a transmitter with a single antenna transmitting to a receiver with a single antenna. The transmitted signal is likely reflected by objects such as the ground, mountains, buildings, and other things that it contacts. In addition, there may be other signals that interfere with the transmitted signal. As a result, when the transmitted communication arrives at the receiver, it has been affected by the channel effect. As a result, the originally-transmitted data is more difficult to decipher due to the added channel effect.

As a result of the channel effect, various approaches have been developed in an effort to reduce or remove that effect from the received signal so that the originally-transmitted data is properly recognized. In other words, these approaches endeavor to improve signal-to-noise ratio ("SNR"), thereby improving other data accuracy measures (e.g., bit error rate ("BER"), frame error rate ("FER"), and symbol error rate ("SER")). One such approach is referred to in the art as a closed loop system, meaning the receiver feeds back information, relating to the channel effect, to the transmitter so that the transmitter can modify its future transmissions so as to compensate for the channel effect. This process repeats so that future changes in the channel effect are again fed back from the receiver to the transmitter, and the transmitter thereafter responds to the updated information relating to the channel effect. Another approach is referred to in the art as an open loop system. In the open loop system, the transmitter also attempts to adjust its transmissions to overcome the channel effect, but the system is termed "open" because there is no feedback from the receiver to the transmitter.

By way of further background, the wireless art also includes other approaches to assist in symbol recovery in view of the channel effect as well as other signal-affecting factors. One such approach is termed antenna diversity, which refers to using multiple antennas at either the transmitter, receiver, or both. For example, in the prior art, a multiple-antenna transmitter is used to transmit the same data on each antenna, with a single antenna receiver then exploiting the differences in the received signals from the different antennas so as to improve SNR. The approach of using more than one transmit antenna at the transmitter is termed transmit antenna diversity, where similarly using more than one receive antenna at the receiver is termed receive antenna diversity. More recently, antenna diversity has been combined with the need for higher data rate. As a result, multiple antenna transmitters have been devised to transmit different data, that is, the data to be transmitted is separated into different streams, with one transmit antenna transmitting a first stream and another transmit antenna transmitting a second stream that is independent from the first stream, and so forth for each of the multiple transmit antennas. In such a case, the receiver typically includes the same, or a greater, number of antennas as the transmitter. Of course, each receiver antenna receives signals from all of the transmit antennas, and these signals also are affected by respective channel effects. Thus, the receiver operates to exploit the use of its multiple antennas as well as recognizing the use of multiple transmit antennas in an effort to fully recover the independent data streams transmitted by the transmitter.

One type of multiple transmit antenna and multiple receive antenna system is known in the art as a multi-input multi-output ("MIMO") system and is shown generally as system 10 in the electrical and functional block diagram of FIG. 1. In the example shown in FIG. 1, system 10 is a CDMA system. System 10 includes a transmitter 12 and a receiver 14. For the sake of convenience, each of transmitter 12 and receiver 14 is discussed separately, below.

Transmitter 12 receives information bits $B_i$ at an input to a channel encoder 16. Channel encoder 16 encodes the information bits $B_i$ in an effort to improve raw bit error rate, where various encoding techniques may be used. The encoded output of channel encoder 16 is coupled to the input of an interleaver 18. Interleaver 18 operates with respect to a block of encoded bits and shuffles the ordering of those bits so that the combination of this operation with the encoding by channel encoder 16 exploits the time diversity of the information, and then those bits are output to a modulator 20. Modulator is in effect a symbol mapper in that it converts its input bits to symbols, each designated generally as $s_i$. The converted symbols $s_i$ may take various known forms, and the symbols $s_i$ may represent various information such as user data symbols, pilot symbols, and control symbols. For the sake of illustration, a stream of two such symbols, $s_1$ followed by $s_2$, are shown as output by modulator 20. Each symbol $s_i$ is coupled to a serial-to-parallel converter 22. In response, serial-to-parallel converter 22 receives the incoming symbols and outputs them in parallel streams along its outputs $22o_1$ and $22o_2$ to a spreader 24. Spreader 24 modulates each data symbol by combining it with, or multiplying it times, a CDMA spreading sequence which can be a pseudo-noise ("PN") digital signal or PN code or other spreading codes (i.e., it utilizes spread spectrum technology), and it may be a single code or a multicode approach where in a MIMO system the code(s) is the same for each transmitting antenna. In a single code instance, the different symbol streams to be transmitted by each transmit antenna $TAT_1$ and $TAT_2$ is multiplied times the same code. In a multicode instance, each stream output $22o_1$ and $22o_2$ is further divided into ds streams. Each of the ds streams is multiplied times a different and orthogonal code from a set of ds codes, where the same set of codes applies to each stream output $22o_1$ and $22o_2$. Also for each set of streams, after the multiplication times the codes, the resulting products are summed and output to a respective one of transmit antennas $TAT_1$ and $TAT_2$. In any event, the spreading sequence facilitates simultaneous transmission of information over a common channel by assigning each of the transmitted signals a unique code during transmission. Further, this unique code makes the simultaneously-transmitted signals over the same bandwidth distinguishable at receiver 14 (or other receivers). In any event, the outputs $24o_1$ and $24o_2$ of spreader 24 are connected to respective transmit antennas $TAT_1$ and $TAT_2$. For example, in a total stream $S_T$ of spread symbols $s_1$, $s_2$, $s_3$, $s_4$, spreader 24 outputs a first stream $S_1$ consisting of spread symbols $s_1$ and $s_3$ to transmit antenna $TAT_1$ and spreader 24 outputs a second stream $S_2$ consisting of spread symbols $s_2$ and $s_4$ to transmit antenna $TAT_2$.

Receiver 14 includes a first receive antenna $RAT_1$ and a second receive antenna $RAT_2$ for receiving communications from both of transmit antennas $TAT_1$ and $TAT_2$. Due to the wireless medium between transmitter 12 and receiver 14, each of receive antennas $RAT_1$ and $RAT_2$ receives signals from both of the transmit antennas $TAT_1$ and $TAT_2$. To further illustrate this effect, FIG. 1 illustrates a different channel effect value $h_{ab}$ from each transmit antenna to each receive antenna, where the first subscript a designates the receive antenna (i.e., 1 for $RAT_1$ and 2 for $RAT_2$), and the second subscript b designates the transmit antenna (i.e., 1 for $TAT_1$ and 2 for $TAT_2$). For sake of reference as well as further analysis below, the received signals are designated $r_1$ and $r_2$ as received by antennas $RAT_2$ and $RAT_2$ respectively.

Moreover, given the preceding description of the channel effect, it now may be observed that each of $r_1$ and $r_2$ includes the transmitted symbols, as influenced by the channel effects; additionally, a noise element $w_2$ also will exist in $r_1$ and $r_2$ and, thus, each of these values may be represented according to the following respective Equations 1 and 2, which relate to the receipt of the first symbols $s_1$ and $s_2$ from streams $S_1$ and $S_2$, respectively:

$$r_1 = h_{11}s_1 + h_{12}s_2 + w_1 \qquad \text{Equation 1}$$

$$r_2 = h_{21}s_1 + h_{22}s_2 + w_2 \qquad \text{Equation 2}$$

Thus, Equations 1 and 2 demonstrate that each receive antenna receives a signal having one component pertaining to one transmitted stream (e.g., $s_1$) and another component pertaining to the other and independently-transmitted stream (e.g., $s_2$).

Given the values $r_1$ and $r_2$ in Equations 1 and 2, they are connected to a despreader and signal separation block 32. The despreader function of block 32 operates according to known principles, such as by multiplying the CDMA signal times the CDMA code for receiver 14 and resolving any multipaths. In addition, since two separate signals are input, then the signal separation function of block 32 separates these signals into estimates of the transmitted symbol streams $S_1$ and $S_2$, and for sake of reference such estimates are shown as $\hat{S}_1$ and $\hat{S}_2$, respectively. In CDMA, the signals may be separated according to various known techniques, such as zero forcing or minimum mean square error, each being either a 1-shot (i.e., linear) or iterative operation, or alternatively a maximum likelihood approach may be implemented. The symbol stream estimates are connected to a parallel-to-serial converter 34, which converts the two parallel streams into a single total estimated symbol stream, $\hat{S}_T$. The estimated symbol stream is connected to a demodulator 36, which removes the modulation imposed on the signal by modulator 20 of transmitter 12. The output of demodulator 36 is connected to a deinterleaver 38. Deinterleaver 38 performs an inverse of the function of interleaver 18 of transmitter 12, and the output of deinterleaver 38 is connected to a channel decoder 40. Channel decoder 40 further decodes the data received at its input, typically operating with respect to certain error correcting codes, and it outputs a resulting stream of decoded symbols. Finally, the decoded symbol stream output by channel decoder 40 may be received and processed by additional circuitry in receiver 14, although such circuitry is not shown in FIG. 1 so as to simplify the present illustration and discussion.

From the preceding, it may be observed that MIMO system 10 has as a basic characteristic that it transmits independent data streams to a receiver such as receiver 14. However, each stream interferes with the other, and receiver 14 receives signals that include components from each of the independently-transmitted symbol streams. The advantage of MIMO system 10 is that it can achieve higher data rate for a given modulation scheme, for example because it simultaneously transmits different streams of data along different transmit antennas. Alternatively, MIMO system 10 allows the use of lower order modulation given the data rate requirement. The disadvantage, however, is that greater channel diversity gain may be achieved in other systems.

Another type of theoretical system proposed in the art is a closed loop system wherein channel information is communicated from a receiver to a transmitter and the transmitter communicates via the channel eigenmodes; such a system is referred to in this document as an eigenmode system and one is shown in electrical and functional block diagram form generally as eigenmode system 50 in FIG. 2. System 50 includes a transmitter 52 and a receiver 54. Within these devices, and for the sake of simplifying the following discussion, portions of transmitter 52 and a receiver 54 are shown to include various of the same or comparable blocks as system 10 in FIG. 1; these blocks therefore use the same reference identifiers in both Figures and the reader is assumed to be familiar with the earlier-described concepts relating to such blocks. Accordingly, the following focuses on those blocks which differ in eigenmode system 50 as compared to system 10, as discussed below.

Looking to transmitter 52, the symbols are output from serial-to-parallel converter 22, in respective symbols streams, along outputs 22$o_1$ and 22. Each of outputs 22$o_1$ and 22$o_2$ is connected as a first multiplicand to a respective multiplier 56$_1$ and 56$_2$, and each of multipliers 56$_1$ and 56$_2$ receives as a second multiplicand a square root of a power weighting factor $p_1$ and $p_2$, respectively. The outputs of multipliers 56$_1$ and 56$_2$ are connected to a matrix multiplication block 58. Matrix multiplication block 58 multiplies the products from multipliers 56$_1$ and 56$_2$ times a matrix U, where U is detailed later after a presentation of the channel effect as characterized by a matrix, H. At this point, for the sake of designation, let the resulting products from matrix multiplication block outputs 58$o_1$ and 58$o_2$ be represented as $x_1$ and $x_2$, as shown in FIG. 2, and thus in response to the various operations on symbols $s_1$ and $s_2$, respectively. The outputs 58$o_1$ and 58$o_2$ of matrix multiplication block 58 are connected to spreader 24, after which the spread signals are connected to transmit antennas $TAT_3$ and $TAT_4$ for transmission to receiver 54.

Receiver 54 includes receive antennas $RAT_3$ and $RAT_4$ for receiving signals $r_1$ and $r_2$ from transmit antennas $TAT_3$ and $TAT_4$. These signals are first despread by a despreader 32. Further, in a way comparable to MIMO system 10 and discussed above with respect to Equations 1 and 2, the signals received by each of receive antennas $RAT_3$ and $RAT_4$ include components from both of the transmit antennas $TAT_3$ and $TAT_4$, as influenced by channel effects $h_{ab}$ from each transmit antenna to each receive antenna. To further explain eigenmode system 50 and the additional processing following despreader 32, let the following matrix H, as shown in Equation 3, include each of these channel effects:

$$H = \begin{bmatrix} h_{11} & h_{12} \\ h_{21} & h_{22} \end{bmatrix} \quad \text{Equation 3}$$

Further, a vector, $\underline{r}$, is now defined to include each of the received signals $r_1$ and $r_2$, according to the following Equation 4:

$$\underline{r} = H \begin{bmatrix} x_1 \\ x_2 \end{bmatrix} + \begin{bmatrix} w_1 \\ w_2 \end{bmatrix} \quad \text{Equation 4}$$

where in Equation 4, H is the channel effect matrix of Equation 3, $x_1$ and $x_2$ are the signals transmitted by transmitter 52, and $w_1$ and $w_2$ are the noise components in the received signals. Further, let the transmitted signals and noise signals be defined as the vectors in the following Equations 5 and 6:

$$\underline{x} = \begin{bmatrix} x_1 \\ x_2 \end{bmatrix} \quad \text{Equation 5}$$

$$\underline{w} = \begin{bmatrix} w_1 \\ w_2 \end{bmatrix} \quad \text{Equation 6}$$

Accordingly, Equation 4 can be re-written in vector form by substituting in the conventions of Equations 5 and 6 to yield the following Equation 7:

$$\underline{r} = H\underline{x} + \underline{w} \quad \text{Equation 7}$$

Having established the various preceding designations, attention is now returned to additional aspects of receiver 54, after which the preceding Equations are further developed to reflect the overall operation of eigenmode system 50. The signals $r_1$ and $r_2$ are connected from receive antennas $RAT_3$ and $RAT_4$, through despreader 32, to a matched filter block 60. Matched filter block 60 multiplies these incoming signals times a matrix that represents a conjugate transpose of an estimate of the channel effect H shown in Equation 3 and, thus, this conjugate transpose is designated $H^H$ and since the estimate is involved it is shown as $\hat{H}^H$. Note that the channel effect used for this computation is generally determined by receiver 54 by estimating the channel effect on pilot symbols it receives from transmitter 52. In the art, the operation of matched filter 60 is sometimes referred to as part of a different block such as a rake, rake filter, space time rake filter, signal separation block, or the like. In any event, the output of matched filter block 60 may be shown as the vector $\underline{y}$ in the following Equation 8:

$$\underline{y} = \hat{H}^H \underline{r} \quad \text{Equation 8}$$

Next, Equation 7 may be substituted for $\underline{r}$ in Equation 8, and assuming the estimate of H is a fairly accurate estimate then the value $H^H$ may be used for $\hat{H}^H$, yielding the following Equation 9:

$$\underline{y} = H^H H \underline{x} + H^H \underline{w} \quad \text{Equation 9}$$

In Equation 9, the result of $H^H H$ is Hermitian symmetric and non-negative definite. Hence, from matrix theory, $H^H H$ may be re-stated according to eigen decomposition as shown in the following Equation 10:

$$H^H H = U \Lambda U^H \quad \text{Equation 10}$$

Eigen decomposition indicates that the factor U from Equation 10 is defined as shown in the following Equation 11:

$$U = [\underline{u}_1, \underline{u}_2] \quad \text{Equation 11}$$

In Equation 11, $\underline{u}_1$ and $\underline{u}_2$ are referred to as eigenvectors, that is, they are the eigenvectors of $H^H H$; sometimes in the wireless art, such vectors are instead referred to as eigenmnodes due to the transmission in response to these values as described later. The eigenvectors are further defined according to the following Equations 12 and 13:

$$\underline{u}_1 = \begin{bmatrix} u_{11} \\ u_{12} \end{bmatrix} \quad \text{Equation 12}$$

$$\underline{u}_2 = \begin{bmatrix} u_{21} \\ u_{22} \end{bmatrix} \quad \text{Equation 13}$$

Additionally, the eigenvectors have the following properties of Equations 14 and 15:

$$\underline{u}_1^H \underline{u}_1 = \underline{u}_2^H \underline{u}_2 = 1 \quad \text{Equation 14}$$

$$\underline{u}_1^H \underline{u}_2 = \underline{u}_2^H \underline{u}_1 = 0 \quad \text{Equation 15}$$

From the above, the two eigenvectors $\underline{u}_1$ and $\underline{u}_2$ are orthogonal and perpendicular, and as shown below they also are non-interfering with one another, which allows transmission of signals in response to these eigenvectors so that those signals do not interfere with one another. Additionally, the matrix U may be re-written with the eigenvectors $\underline{u}_1$ and $\underline{u}_2$ in its columns, as shown in the following Equation 16:

$$U = \begin{bmatrix} u_{11} & u_{12} \\ u_{21} & u_{22} \end{bmatrix} \quad \text{Equation 16}$$

Eigen decomposition also indicates that the factor $\Lambda$ from Equation 10 is defined as shown in the following Equation 17:

$$\Lambda = \begin{bmatrix} \lambda_1 & 0 \\ 0 & \lambda_2 \end{bmatrix} \quad \text{Equation 17}$$

In the diagonal matrix of Equation 17, and in connection with $H^H H$, $\lambda_1$ and $\lambda_2$ are referred to as its eigenvalues, and they are real numbers greater than or equal to zero. Additionally, each eigenvalue $\lambda_1$ and $\lambda_2$ is linked to a corresponding one of the eigenvectors $\underline{u}_1$ and $\underline{u}_2$, respectively, and are analogous to a gain factor for the corresponding eigenvector. This relationship can similarly be shown by re-writing Equation 10 as the following Equation 18:

$$H^H H = U \Lambda U^H = \sum_{i=1}^{2} \lambda_i \underline{u}_i \underline{u}_i^H \quad \text{Equation 18}$$

From Equation 18, one skilled in the art will, therefore appreciate the correspondence of the eigenvalue $\lambda_1$ with the eigenvector $\underline{u}_1$ and the correspondence of the eigenvalue $\lambda_2$ with the eigenvector $\underline{u}_2$.

Continuing now with receiver 54, the resulting vector $\underline{y}$ from matched filter 60 is output to a matrix multiplication block 62. Matrix multiplication block 62 multiplies its vector input times the conjugate transpose of the matrix U of Equation 16, that is, the multiplicand is therefore $U^H$. The result of this operation, as further detailed below, provides a vector $\underline{z}$ that includes separate output symbols $z_1$ and $z_2$, and which correspond to the independently-transmitted signals $x_1$ and $x_2$, respectively (and, hence, also to symbols $s_1$ and $s_2$, respectively). Thus, the operation of matrix multiplication block 62 may be represented by the following Equation 19:

$$\underline{z} = U^H \underline{y} \quad \text{Equation 19}$$

From the above, it has been shown that transmitter 52 includes a matrix multiplication block 58 that multiplies parallel input symbols streams times the matrix U, and receiver 54 includes a matrix multiplication block 58 that multiplies its input signals times the conjugate transpose of that matrix, namely, $U^H$. These aspects are now further explored so as to demonstrate how these operations provide for the transmission of independent symbol streams and the recovery of those streams at receiver 54 without interference between them.

Returning to transmitter 52, recall that symbols $s_1$ and $s^2$ are multiplied times $\sqrt{p_1}$ and $\sqrt{p_2}$, respectively. This operation may be represented mathematically by defining the matrix, $\Pi$, in the following Equation 20:

$$\Pi = \begin{bmatrix} \sqrt{p_1} & 0 \\ 0 & \sqrt{p_2} \end{bmatrix} \quad \text{Equation 20}$$

Further, let the vector $\underline{s}$ be defined to include the symbols $s_1$ and $s_2$, and let the vector $\underline{x}$ be defined to include the transmitter outputs $x_1$ and $x_2$, then the output of transmitter 52 is as shown in the following Equation 21:

$$\underline{x} = U \Pi \underline{s} \quad \text{Equation 21}$$

Returning to receiver 54, recall that blocks 60 and 62 perform multiplications times $H^H$ and $U^H$, respectively. The effect of these multiplications now may be appreciated further, particularly by substituting Equation 10 into Equation 9, to yield the vector shown in the following Equation 22:

$$\underline{y} = U \Lambda U^H \underline{x} + H^H \underline{w} \quad \text{Equation 22}$$

Next, Equation 22 may be substituted into Equation 19 for $\underline{y}$ to define the output vector, $\underline{z}$, from multiplication block 62, as is shown in the following Equation 23:

$$\underline{z} = U^H (U \Lambda U^H \underline{x} + H^H \underline{w}) = U^H U \Lambda U^H \underline{x} + U^H H^H \underline{w} \quad \text{Equation 23}$$

Equation 23 can be reduced due to the property of the eigenvector matrix U as shown in the following Equation 24:

$$U^H U = I = \begin{bmatrix} 1 & 0 \\ 0 & 1 \end{bmatrix} \quad \text{Equation 24}$$

From Equation 24, therefore, the identity matrix result, I, may be removed from Equation 23, and additionally Equation 21 may be substituted into Equation 23 for $\underline{x}$, while also disregarding the noise term relating to the vector $\underline{w}$, with the result shown in the following Equation 25:

$$\underline{z} = \Lambda U^H \underline{x} = \Lambda U^H U \Pi \underline{s} = \Lambda \Pi \underline{s} \quad \text{Equation 25}$$

Having developed Equation 25 as a result of the two matrix multiplications (i.e., $U^H$, $H^H$) in receiver 54, it is now shown how the eigenmode transmissions do not interfere with one another. Specifically, Equation 25 may be fully written out and simplified according to the following Equation 26:

$$\begin{bmatrix} z_1 \\ z_2 \end{bmatrix} = \begin{bmatrix} \lambda_1 & 0 \\ 0 & \lambda_2 \end{bmatrix} \begin{bmatrix} \sqrt{p_1} & 0 \\ 0 & \sqrt{p_2} \end{bmatrix} \quad \text{Equation 26}$$

$$\begin{bmatrix} d_1 \\ d_2 \end{bmatrix} = \begin{bmatrix} \lambda_1 \sqrt{p_1} & 0 \\ 0 & \lambda_2 \sqrt{p_2} \end{bmatrix} \begin{bmatrix} s_1 \\ s_2 \end{bmatrix} = \begin{bmatrix} \lambda_1 s_1 \sqrt{p_1} \\ \lambda_2 s_2 \sqrt{p_2} \end{bmatrix}$$

From Equation 26, it may be seen that as a result of the multiplication by blocks 60 and 62, $z_1$ is a value that is responsive to $s_1$ irrespective of $s_2$, and similarly, $z_2$ is a value that is responsive to $s_2$ irrespective of $s_1$. In other words, there is no interference as between $s_1$ and $s_2$, as transmitted to receiver 54. This result occurs due to the orthogonality property shown in Equation 24, as realized by the multiplication of the transmitted signals by U in block 52 and the later multiplication of the received signals by $U^H$ in block 62. As a result, following block 62, and unlike certain other wireless systems, there is no additional interference cancellation block in receiver 54.

While eigenmode system 50 provides communication of independent symbol streams and does not require interference cancellation at the receiver, note that transmitter 52 necessarily requires sufficient channel state information to determine the matrix U. In an FDD system where the uplink and downlink channels are asymmetric, then receiver 54 must therefore provide this information to transmitter 52 in some form. For example, receiver 54 must either receive the eigenvectors and eigenvalues from receiver 54, or it must receive sufficient information from receiver 54 so that it may determine these values on its own from the received information. However, for FDD systems, the requirement of feeding back sufficient state information may itself not be feasible due to the high amount of bandwidth that would be required to feed back such information. For example, when four transmit antennas are used, then possibly four eigenvectors must be computed by receiver 54 and fed back, where each eigenvector is represented by four coefficients (including the power weighting eigenvalue for each stream), representing a total of 16 coefficients. Assuming that each coefficient is quantized to $N_Q$ bits, this requires a $16 \times N_Q$ bit feedback resource. However, in the current WCDMA standard, only 1 feedback bit per slot is sent to the transmitter. Thus, to implement an eigenmode system even for $N_Q=2$, this would result in an intrinsic delay of 32 slots, which therefore is not acceptable even in slow fading channels. In addition, trade-offs may be realized by transmitting only via the best channel eigenvector which gives the maximum diversity gain at the expense of low data rate, or one may utilize all the channel eigenvectors to transmit different data streams and thus increase the data rate, while losing diversity gain and hence decreasing performance. In theory, to partially overcome this loss of diversity, a power allocation scheme across eigenvectors can be used to reduce the channel variation caused by the fading. However, for FDD systems where the requirement of feeding back state information may itself not be feasible due to the high amount of bandwidth it consumes, this additional amount of feedback makes the total amount of return information even less feasible. Moreover, if the feedback rate is fixed, such a proposal would increase the delay time before transmitter 52 acquires the eigenvectors. This then results in a large performance loss, particularly when the channel is time varying.

In view of the above, there arises a need to address the drawbacks of the prior art and the preceding proposals, as is achieved by the preferred embodiments described below.

BRIEF SUMMARY OF THE INVENTION

In the preferred embodiment, there is a wireless receiver for receiving signals from a transmitter. The transmitter comprises a plurality of transmit antennas for transmitting the signals, which comprise respective independent streams of symbols. Additionally, interference occurs between the respective streams. The receiver comprises a plurality of receive antennas for receiving the signals as influenced by a channel effect between the receiver and the transmitter. The receiver also comprises circuitry for multiplying the signals times a conjugate transpose of an estimate of the channel effect and times a conjugate transpose of a linear basis transformation matrix. The receiver also comprises circuitry for selecting the linear basis transformation matrix from a finite set of linear basis transformation matrices. Lastly, the receiver comprises circuitry for removing the interference between the respective streams. Other aspects are also disclosed and claimed.

BRIEF DESCRIPTION OF THE SEVERAL VIEWS OF THE DRAWING

FIG. 4 illustrates an electrical and functional block diagram of a double space time block coded transmit antenna diversity system according to another preferred embodiment and which includes a transmitter and a receiver.

DETAILED DESCRIPTION OF THE INVENTION

Figure 1:
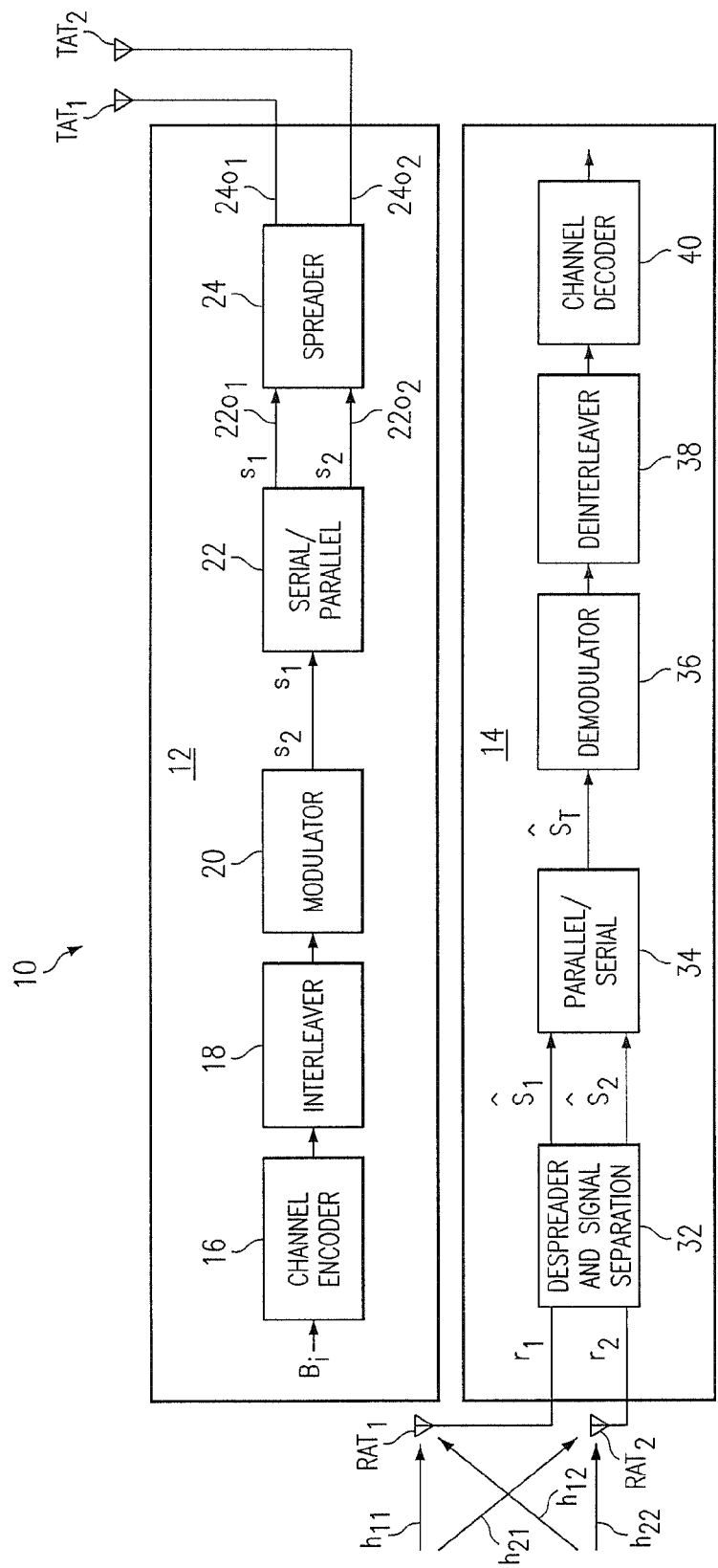
FIG. 1 illustrates an electrical block diagram of a prior art CDMA system with a transmitter and a receiver.
Figure 2:
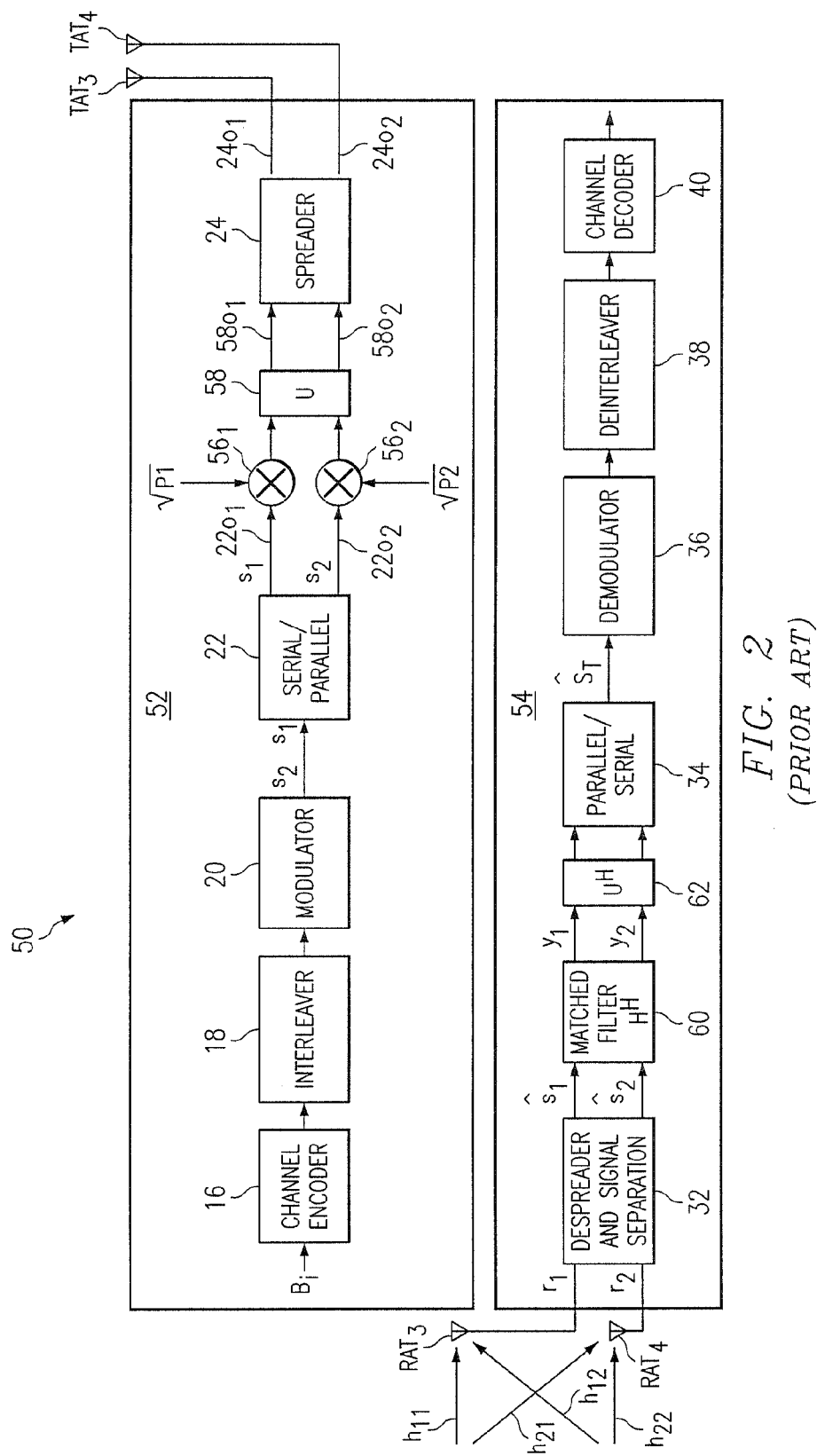
FIG. 2 illustrates an electrical block diagram of a proposed eigenmode system with a transmitter and a receiver.

FIGS. 1 and 2 were described earlier in the Background Of The Invention section of this document and the reader is assumed to be familiar with the concepts described therein.

By way of introduction, the preferred embodiments provide a wireless communication system wherein multiple transmit antennas are used to communicate independent symbol streams and where, prior to transmission, those streams are transformed using a linear basis; preferably the linear basis is selected by the receiver from a finite set of different bases and an identification of the selected basis, along with any parameter(s) corresponding to that basis, are communicated (i.e., fed back) from the receiver to the transmitter. Such an approach may be implemented in a variety of multi-antenna systems, and for sake of illustration two such systems are described along with variations on each. Finally, there is presented additional discussion from which one skilled in the art should appreciate the application of these principles to still other systems.

Figure 3:
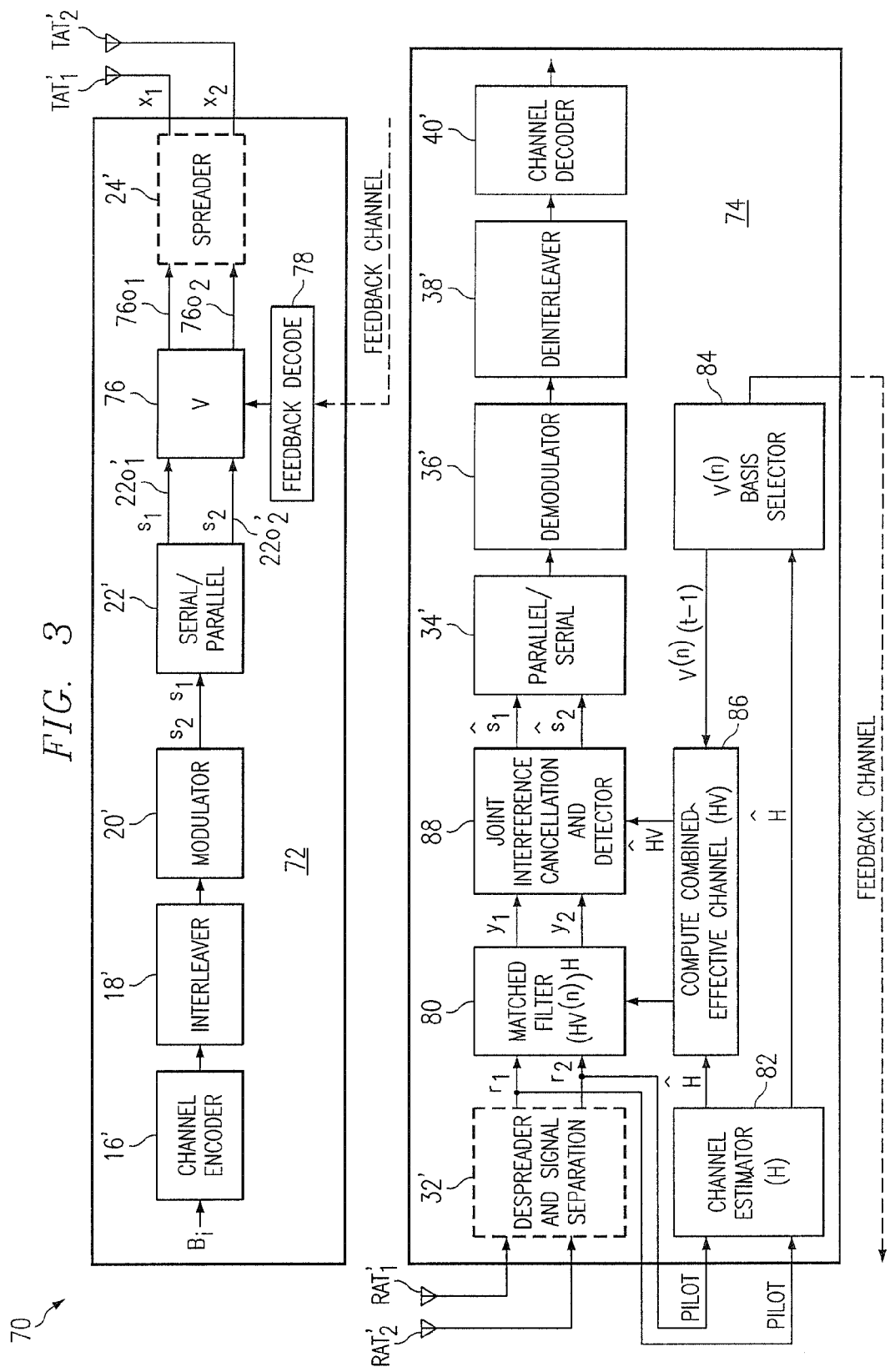
FIG. 3 illustrates an electrical and functional block diagram of a multi-input multi-output ("MIMO") system according to one preferred embodiment and which includes a transmitter and a receiver.

FIG. 3 illustrates an electrical and functional block diagram of a multi-input multi-output ("MIMO") system 70 according to one preferred embodiment. As FIG. 3 represents an electrical and functional block diagram, one skilled in the art may ascertain various technical manners of implementing system 70 using a combination of hardware and software, including the preferred used of a digital signal processor to include at least some of the illustrated blocks. Turning then to system 70, it includes a transmitter 72 and a receiver 74. Transmitter 72 and receiver 74 in some respects are comparable to system 10 described earlier; thus, to simplify the present discussion the comparable blocks are shown with a like reference identifier, with the addition of an apostrophe to the identifier in FIG. 3 so that certain blocks may be referred to with respect to system 70 without causing a confusing reference as to the earlier prior art system 10. Additionally, the comparable blocks are discussed to a lesser extent below given the previous discussion as well as the skill in the art. Finally, as a multiple antenna system, in the illustrated example two transmit and two receive antennas are illustrated. However, the present inventive teachings may be extended to various systems with P transmit antennas and Q receive antennas.

Looking to transmitter 72, functional blocks 16' through 24' are now described with it understood that generally these blocks may perform functions known in the art, with the overall function of transmitter 72, including these blocks, being improved based on additional functional blocks described below. Transmitter 72 receives information bits B at an input to a channel encoder 16', which encodes the information bits $B_i$ in an effort to improve raw bit error rate. Various encoding techniques may be used by channel encoder 16 and as applied to bits $B_i$, with examples including the use of convolutional code, block code, turbo code, concatenated codes, or a combination of any of these codes. The encoded output of channel encoder 16' is coupled to the input of an interleaver 18'. Interleaver 18' operates with respect to a block of encoded bits and shuffles the ordering of those bits so that the combination of this operation with the encoding by channel encoder 16' exploits the time diversity of the information. For example, one shuffling technique that may be performed by interleaver 18' is to receive bits in a matrix fashion such that bits are received into a matrix in a row-by-row fashion, and then those bits are output from the matrix to a modulator 20' in a column-by-column fashion. Modulator 20' is in effect a symbol mapper in that it converts its input bits to symbols, designated generally as $s_i$. The converted symbols $s_i$ may take various forms, such as quadrature phase shift keying ("QPSK") symbols, binary phase shift keying ("BPSK") symbols, or quadrature amplitude modulation ("QAM") symbols. In any event, symbols $s_i$ may represent various information such as user data symbols, pilot symbols, and control symbols such as transmit power control ("TPC") symbols and rate information ("RI") symbols. Symbols $s_i$ are coupled to a serial-to-parallel converter 22'. Serial-to-parallel converter 22' receives incoming symbols and outputs them in parallel along its outputs 22$o_1$' and 22$o_2$'. For the sake of example, therefore, FIG. 3 illustrates that a stream of symbols, $s_1$ followed by $s_2$, is input to serial-to-parallel converter 22' and serial-to-parallel converter 22' therefore outputs symbol $s_1$ along output 22$o_1$' and symbol $s_2$ along output 22$o_2$'.

The independent parallel symbol streams from serial-to-parallel converter 22' are connected as inputs to a matrix multiplication block 76. Matrix multiplication block 76 performs a linear basis transformation on its inputs by multiplying the signals from outputs 22$o_1$ and 22$o_2$ times a linear basis transformation matrix $V^{(n)}$, where $V^{(n)}$ is detailed later. By way of introduction, $V^{(n)}$ is selected by receiver 74 from a finite set of different matrices and receiver 74 identifies that selection to transmitter 72 via the wireless feedback control channel between receiver 74 and transmitter 72, where a dashed line represents this wireless feedback link from receiver 74 to transmitter 72. Further in this regard, transmitter 72 includes a feedback decode block 78 and along the feedback path receiver 74 provides sufficient information to feedback decode block 78 to indicate the selection of $V^{(n)}$. As detailed below, there may be one or more parameters associated with $V^{(n)}$, and these parameters are also communicated along the feedback path to feedback decode block 78. In response, feedback decode block 78 determines the appropriate values for $V^{(n)}$ and provides them to matrix multiplication block 76 so that it may multiply $V^{(n)}$ times the incoming independent parallel symbol streams from outputs 22$0o_1$' and 22$o_2$' of serial-to-parallel converter 22'. Lastly, as detailed below, in the preferred embodiment the selection of $V^{(n)}$ is in response to the channel effect, H, between transmitter 72 and receiver 74 and it also may be selected in response to the type of joint interference cancellation technique implemented by receiver 74.

The outputs 76$o_1$ and 76$o_2$ of matrix multiplication block 76 are in a CDMA embodiment connected to a spreader 24', or alternatively in a TDMA embodiment those outputs are connected directly to respective transmit antennas $TAT_1$' and $TAT_2$' (via a digital-to-analog interface, not shown). Due to these alternatives, spreader 24' is shown within a dashed line block. Looking first to the CDMA implementation, spreader 24' modulates each data symbol by combining it with, or multiplying it times, a CDMA spreading sequence which can be a pseudo-noise ("PN") digital signal or PN code or other spreading codes (i.e., it utilizes spread spectrum technology), where the approach therefore may be a single or multicode approach. In a single code instance, the signals from each of the different outputs 76$o_1$ and 76$o_2$ is multiplied times the same code. In a multicode instance, each stream output 76$o_1$ and 76$o_2$ is further divided into ds streams. Each of those ds streams is multiplied times a different and orthogonal code in a given set of ds codes, and where the same set of ds codes is used for each of the different outputs 76$o_1$ and 76$o_2$. Further, for each set of ds streams corresponding to outputs 76$o_1$ and 76$o_2$, the resulting products following the code multiplication are summed and the sum is output to a respective one of antennas $TAT_1$' and $TAT_2$'. Further, the outputs of spreader 24' are connected to respective transmit antennas $TAT_1$' and $TAT_2$' via a digital-to-analog interface, not shown. From the above, therefore, note that spreader 24' is optional in that it is implemented when transmitter 72 is to function as a CDMA transmitter and it is not implemented when transmitter 72 is to function as a TDMA transmitter. In either event, the ultimate signals are connected, with or without spreading, to respective transmit antennas $TAT_1$' and $TAT_2$', and for the sake of later reference, let the signals communicated by transmit antennas $TAT_1$' and $TAT_2$' be designated as $x_1$ and $x_2$, respectively.

Turning to receiver 74, it includes receive antennas $RAT_1$' and $RAT_2$', where those antennas in a CDMA embodiment are connected to a despreader 32' and in a TDMA embodiment they are connected directly to a matched filter 80 (with either connection being through an analog-to-digital interface, not shown). Again due to the alternatives including an option to exclude despreader 32', then it is shown within a dashed line block. Further, these options correspond to those stated above with respect to transmitter 72 in connection with its spreader 24', that is, when system 70 is implemented as a CDMA system, then spreader 24' and despreader 32' are included, whereas when system 70 is implemented as a TDMA system, then spreader 24' and despreader 32' are not included. Still further, despreader 32' should accommodate the number of codes used by spreader 24', where recall above there is discussed both a single code and multicode alternative, where one skilled in the art may readily implement the corresponding despreading apparatus in despreader 32' based on which of these alternatives is implemented. In any event, let the signals received by receive antennas $RAT_1$' and $RAT_2$' be indicated as $r_1$ and $r_2$, with or without subsequent despreading.

The signals $r_1$ and $r_2$ are connected to a matched filter 80. In the preferred embodiment, matched filter 80 multiplies the incoming signals times a matrix that represents a conjugate transpose of an estimate of the channel effect H, that is, it multiplies times $\hat{H}^H$, where the value $\hat{H}$ designates the estimate of H; in addition, however, it also multiplies times the conjugate transpose of $V^{(n)}$, where recall that $V^{(n)}$ is imparted into the communicated signals by matrix multiplication block 76 of transmitter 72. Thus, by combining both multiplicand matrices, it may be stated that matched filter 80 produces outputs $y_1$ and $y_2$ in a vector $\underline{y}$, where this operation is represented by the following Equation 27:

$$\underline{y} = V^{(n)H} \hat{H}^H \underline{r} = (\hat{H}V^{(n)})^H \underline{r} \qquad \text{Equation 27}$$

Further in connection with receiver 74 and Equation 27, receiver 74 also includes blocks that determine and provide the values of $\hat{H}$ and $V^{(n)}$. These blocks are further described below.

Receiver 74 includes a channel estimator 82 that receives the pilot symbols from receive antennas $RAT_1'$ and $RAT_2'$, where these pilot symbols are typically communicated in a separate channel such as the known common pilot channel ("CPICH"). In such a case, the pilot symbols are spread by transmitter 72 with a code that differs from the code used to spread the data channel. Alternatively, pilot symbols could be included in the same channel as the data symbols in which case both the pilot and data symbols are spread with the same code. In either approach, therefore, the spreading of the pilot symbols requires a despreading operation at receiver 74 and, thus, the pilot symbols are shown for illustration purposes as provided from the output of despreader 32'. In response to the pilot symbols, channel estimator 82 determines an estimated value of H (designated as $\hat{H}$). Specifically, the values of $r_1$ and $r_2$ at a time t, including the pilot symbols in those signals, should be represented by the following Equation 28:

$$[r_1 \ r_2] = [h_1 \ h_2] V^{(n)}(t-1) \begin{bmatrix} s_1 \\ s_2 \end{bmatrix} + \text{noise} = \qquad \text{Equation 28}$$

$$HV^{(n)}(t-1)s + \text{noise}$$

However, given Equation 28, note that in the preferred embodiment the pilot symbols are in the separate CPICH channel and that channel is not multiplied times $V^{(n)}$ by transmitter 72. Accordingly, for the sake of the pilot symbols representing s and included in $r_1$ and $r_2$, then the term $V^{(n)}(t-1)$ drops out of Equation 28; as a result, channel estimator 82 estimates H by solving for it from the received values of $r_1$, $r_2$, and the known pilot symbol values s, where H is therefore the determined channel effect estimate. Note that the preceding assumes that the pilot symbols are not transformed using the basis matrix, $V^{(n)}(t-1)$ by transmitter 72; in an alternative embodiment, the pilot symbols along with the data symbols can be communicated by transforming them in response to the basis matrix, such as where the pilot and data symbols are communicated along the same channel. In this alternative, then $V^{(n)}$ remains in Equation 28 insofar as the pilot and data symbols are concerned, and the total product $HV^{(n)}$ may be determined by channel estimator 82 given the known values of $r_1$, $r_2$, and s. Once $\hat{H}$ is determined by channel estimator 82, it is output to a $V^{(n)}$ basis selector block 84 and to a compute combined effective channel block 86, each of which is discussed below.

As further detailed later, $V^{(n)}$ basis selector block 84 periodically chooses $V^{(n)}$ from a finite set of bases $\{V^{(1)}, V^{(2)}, \ldots, V^{(N)}\}$. $V^{(n)}$ basis selector block 84 then communicates an identification of the selected $V^{(n)}$ from receiver 74 back to transmitter 72 along the feedback path shown by way of a dashed line between the two. Further, the selection of $V^{(n)}$ is repeated over time so that $V^{(n)}$ therefore changes over time, that is, at a time t=1, then a basis $V^{(n)}(1)$ is communicated in this manner, and a time t=2, then a basis $V^{(n)}(2)$ is communicated in this manner, and so forth for $V^{(n)}(t)$ at a different time t. In other words, system 70 is adaptive in the sense that it periodically re-evaluates the set of differing bases in the set of bases and may from time to time it uses different ones of those bases to transform communications so as to improve communication performance. Given these time-vary ing values, then $V^{(n)}$ basis selector block 84 also communicates an identification of $V^{(n)}$ to a compute combined effective channel block 86, as detailed below.

Compute combined effective channel block 86 determines the product of the matrices it receives from blocks 82 and 84 (unless that product was already determined by due to the inclusion of the pilot and data in the same channel as discussed above with respect to channel estimator 82). To perform this operation, recall that $V^{(n)}$ basis selector block 84 communicates to block 86 each value of $V^{(n)}$ and, therefore, this includes the immediately previous value of $V^{(n)}$ that it fed back to transmitter 72 (i.e., $V^{(n)}(t-1)$). In response, block 86 determines the product of $\hat{H}$ and $V^{(n)}(t-1)$, where the designation of this product is simplified in the remaining discussion by dropping the temporal aspect of (t−1) and hence, is referred to as $(\hat{H}V^{(n)})$. Further, this product, or its conjugate transpose, $(\hat{H}V^{(n)})^H$, is output by block 86 to matched filter 80, which uses this product to solve for the vector $\underline{y}$ in Equation 27 described above.

The outputs $80_1$ and $80_2$ of matched filter 80 provide $y_1$ and $y_2$ of the vector $\underline{y}$ to a joint interference cancellation and detector block 88, and block 88 also receives the value of $(\hat{H}V^{(n)})^H$ from compute combined effective channel block 86. In general, each input $y_x$ to matched filter 80 is corrupted with interference from the other streams. Accordingly, block 88 performs as its name suggests, that is, it removes the interference that exists in $y_1$ and $y_2$, as it arose from the originally-independent transmitted symbols $s_1$ and $s_2$, thereby producing two respective separated estimated symbols $\hat{s}_1$ and $\hat{s}_2$. Further in this regard, block 88 performs its function according to any one of various algorithms known in the art. At least the following approaches are contemplated for block 88 and include: (i) zero forcing or minimum mean square error ("MMSE"); (ii) 1-shot (i.e., linear) or iterative; (iii) 1-stage or multistage; and (iv) maximum likelihood detection. Certain of these techniques also may be combined, as is known, such as with a linear MMSE, an iterative MMSE, a linear zero forcing, and an iterative zero forcing. Moreover, one skilled in the art may contemplate other examples as well. Lastly, note that the operation of block 88 is a linear function, as is the operation of matched filter 80. Accordingly, the order of these two operations may be reversed and, thus, the ordering as shown in FIG. 3 is only by way of example.

The estimated symbols $\hat{s}_1$ and $\hat{s}_2$ are output by joint interference cancellation and detector block 88 to the remaining circuitry in receiver 74, which may be constructed and operate according to known principles. Thus, these outputs are preferably connected to a parallel-to-serial converter 34', which converts the two parallel streams into a single total estimated symbol stream, $\hat{S}_T$. The estimated symbol stream is connected to a demodulator 36', which removes the modulation imposed on the signal my modulator 20' of transmitter 72. The output of demodulator 36' is connected to a deinterleaver 38', which performs an inverse of the function of interleaver 18' of transmitter 72, and the output of deinterleaver 38' is connected to a channel decoder 40'. Channel decoder 40' may include a Viterbi decoder, a turbo decoder, a block decoder (e.g., Reed-Solomon decoding), or still other appropriate decoding schemes as known in the art. In any event, channel decoder 40' further decodes the data received at its input, typically operating with respect to certain error correcting codes, and it outputs a resulting stream of decoded symbols. Indeed, note that the probability of error for data input to channel decoder 40' is far greater than that after processing and output by channel decoder 40'. Finally, the decoded symbol stream output by channel decoder 40' may be received and processed by additional circuitry in receiver 74, although such circuitry is not shown in FIG. 3 so as to simplify the present illustration and discussion.

Returning now to discuss $V^{(n)}$ basis selector block 84 in greater detail, recall that it periodically chooses $V_{(n)}$ from a finite set of bases $\{V^{(1)}, V^{(2)}, \ldots, V^{(N)}\}$, where this set also can be represented by the designation $\{V^{(n)}\}_{n=1}^{N}$. Attention is now directed to certain preferred sets of those bases. When the preferred embodiment is implemented in a MIMO-type system such as is shown for system 70, then two different basis sets are preferred, with one that rotates the received signals in two-dimensional space and another that includes the rotation and adds a potential phase change as another dimension, where both basis sets are described below. In either case and for a MIMO-type implementation, and for P=2, then the linear basis transformation matrix $V^{(n)}$, as used by matrix multiplication block 76, is a 2×2 matrix. Accordingly, $V^{(n)}$ basis selector 84 of receiver 74 evaluates a set of 2×2 matrices, and it identifies back to transmitter 72 the one that optimizes performance as also detailed later.

In one preferred embodiment, the finite set of bases $\{V^{(n)}\}_{n=1}^{N}$ is as shown in the following Equations 29 and 30:

$$V^{(n)} = \begin{bmatrix} \cos\theta_n & -\sin\theta_n \\ \sin\theta_n & \cos\theta_n \end{bmatrix} \quad \text{Equation 29}$$

$$\theta_n = \frac{\pi}{2N}(n-1), \quad n = 1, 2, \ldots, N \quad \text{Equation 30}$$

To further illustrate Equation 29 and 30, consider an example wherein N=4, that is, where there are four possible linear basis transformation matrices from which receiver 74 may select an optimum one of those matrices. As applied to Equations 29 and 30, therefore, the four matrices in the set $\{V^{(n)}\}_{n=1}^{N}$ have the differing degrees of signal rotation shown in the following Equations 31 through 34:

$$V^{(1)} = \quad \text{Equation 31}$$

$$\begin{bmatrix} \cos\{\frac{\pi}{8}(0)\} & -\sin\{\frac{\pi}{8}(0)\} \\ \sin\{\frac{\pi}{8}(0)\} & \cos\{\frac{\pi}{8}(0)\} \end{bmatrix} = \begin{bmatrix} \cos(0) & -\sin(0) \\ \sin(0) & \cos(0) \end{bmatrix} = \begin{bmatrix} 1 & 0 \\ 0 & 1 \end{bmatrix}$$

$$V^{(2)} = \begin{bmatrix} \cos\{\frac{\pi}{8}(1)\} & -\sin\{\frac{\pi}{8}(1)\} \\ \sin\{\frac{\pi}{8}(1)\} & \cos\{\frac{\pi}{8}(7)\} \end{bmatrix} = \quad \text{Equation 32}$$

$$\begin{bmatrix} \cos(\frac{\pi}{8}) & -\sin(\frac{\pi}{8}) \\ \sin(\frac{\pi}{8}) & \cos(\frac{\pi}{8}) \end{bmatrix} = \begin{bmatrix} .9239 & -.3827 \\ .3827 & .9239 \end{bmatrix}$$

$$V^{(3)} = \begin{bmatrix} \cos\{\frac{\pi}{8}(2)\} & -\sin\{\frac{\pi}{8}(2)\} \\ \sin\{\frac{\pi}{8}(2)\} & \cos\{\frac{\pi}{8}(2)\} \end{bmatrix} = \quad \text{Equation 33}$$

$$\begin{bmatrix} \cos(\frac{\pi}{4}) & -\sin(\frac{\pi}{4}) \\ \sin(\frac{\pi}{4}) & \cos(\frac{\pi}{4}) \end{bmatrix} = \begin{bmatrix} .7071 & -.7071 \\ .7071 & .7071 \end{bmatrix}$$

$$V^{(3)} = \begin{bmatrix} \cos\{\frac{\pi}{8}(3)\} & -\sin\{\frac{\pi}{8}(3)\} \\ \sin\{\frac{\pi}{8}(3)\} & \cos\{\frac{\pi}{8}(3)\} \end{bmatrix} = \quad \text{Equation 34}$$

$$\begin{bmatrix} \cos(.375\pi) & -\sin(.375\pi) \\ \sin(.375\pi) & \cos(.375\pi) \end{bmatrix} = \begin{bmatrix} .3827 & -.9239 \\ .9239 & .3827 \end{bmatrix}$$

From the preceding, it may be appreciated that by implementing $V^{(n)}$ of Equation 29, then receiver 74 is only required to feed back the selected matrix to transmitter 72 by communicating the value of n. Given n, and assuming feedback decode block 78 of transmitter 72 is informed (e.g., programmed with) of N and Equations 29 and 30, then in response to n, feedback decode block 78 outputs the appropriate matrix $V^{(n)}$ to matrix multiplication block 76, and matrix multiplication block 76 essentially performs a signal rotation of $\theta_n$ degrees in two-dimensional space by multiplying $V^{(n)}$ times its input symbols. Lastly, note that since n=1, 2, ..., N, then in the example where N=4, then receiver 74 requires only 2 bits (i.e., $\log_2(4)=2$) to feed back this information to transmitter 72.

In another preferred embodiment, the finite set of bases $\{V^{(n)}\}_{n=1}^{N}$ is as shown in the following Equations 35 through 37:

$$V^{(n)} = \begin{bmatrix} \cos\theta_n e^{j\phi_m} & -\sin\theta_n e^{j\phi_m} \\ \sin\theta_n & \cos\theta_n \end{bmatrix} \quad \text{Equation 35}$$

$$\theta_n = \frac{\pi}{2N}(n-1), \quad n = 1, 2, \ldots, N \quad \text{Equation 36}$$

$$\phi_m = \frac{\pi}{2M}(m-1), \quad m = 1, 2, \ldots, M \quad \text{Equation 37}$$

For the sake of simplifying the discussion, the various combinations of Equations 35 through 37 achieved by the different values of n and m are not set forth herein, but they should be appreciated by one skilled in the art. In addition, by comparing Equation 35 to Equation 29, one skilled in the art should appreciate that by implementing $V^{(n)}$ of Equation 35, then receiver 74 feeds back an identification of the selected matrix to transmitter 72 by communicating the value of n so as to achieve a rotation of $\theta_n$ degrees in two-dimensional space, and in addition receiver 74 feeds back the selected amount of phase change by communicating the value of nm. Thus, the rotation and phase change may be accomplished by receiver feeding back only a total of $\log(N)+\log_2(M)$ bits to transmitter 72.

From the above, two different sets of linear basis transformation matrices $V^{(n)}$ have been demonstrated in accordance with the preferred embodiment. Observe that both basis parameterizations in Equations 29 and 35 result in orthonormal matrices. However, one skilled in the art may ascertain other choices of parameterization which do not result in orthonormal matrices while still falling within the present inventive scope. Additionally, the preceding linear basis transformation matrices are merely examples of preferred matrices, and others are contemplated. For example, for P>2, a generalized rotation matrix, such as a Givens rotation scheme, can be used. Still others are also ascertainable by one skilled in the art.

Having illustrated various different possible finite sets of $\{V^{(n)}\}_{n=1}^{N}$, recall that given one of those sets, $V^{(n)}$ basis selector block 84 identifies one matrix $V^{(n)}$ as the optimum performer and receiver 74 identifies that matrix to transmitter 72. Attention is now turned to the criterion or criteria used by $V^{(n)}$ basis selector block 84 to, at a given time, make this selection of one basis from among a set of bases. In general, each basis $V^{(n)}$ is selected to optimize a performance criterion or criteria. The ultimate goal is to minimize bit error rate ("BER"). In this regard, the preferred embodiments recognize that BER is influenced by the channel effect H, and the channel effect H affects signal-to-interference-noise ratio ("SINR"). In other words, SINR is a function of H and, accordingly, in the preferred embodiment $V^{(n)}$, basis selector block 84 endeavors to periodically select $V^{(n)}$ in response to the then-existing SINR, that is, the criterion for selecting $V^{(n)}$ is based on optimizing SINR. To accomplish this operation, note that channel estimator 82 not only provides the estimated channel effect $\hat{H}$ to block 86, but it also provides it to basis selector 84 so that basis selector 84 may determine the SINR from $\hat{H}$ and select a basis $V^{(n)}$ accordingly. In addition to considering the estimated channel effect $\hat{H}$ (and the corresponding SINR), in the preferred embodiment the selection of $V^{(n)}$ also may be based on the type of technique implemented by joint interference cancellation and detector block 88. Specifically, recall from above that numerous alternatives are contemplated for block 88; accordingly, for a given value of $\hat{H}$, then the specific technique implemented by block 88 also therefore may influence the selection of $V^{(n)}$; in other words, an additional criterion of basis selector 84 in making its selection may be the technique implemented by block 88. These criteria are further explored below.

In one preferred approach, $V^{(n)}$ basis selector block 84 determines the optimum. SINR by applying each of the bases in the finite set $\{V^{(n)}\}_{n=1}^{N}$ to each of the P (e.g., two in FIG. 3) data streams to thereby produce SINR values for each, and then the criterion for selecting the basis by block 84 is choosing the basis that provides the maximum of the minimum SINR values. For example, assume that N=4 in the finite set $\{V^{(n)}\}_{n=1}^{N}$ and assume that P=2 as in FIG. 3. Then block 84 first determines the SINR for each different basis in the set, as applied to each independently-transmitted stream, and as measurable using various known techniques in view of $\hat{H}$, as shown in the following Table 1:

TABLE 1

|  | $V^{(1)}$ | $V^{(2)}$ | $V^{(3)}$ | $V^{(4)}$ |
|---|---|---|---|---|
| $s_1$ | $SINR_1^{(1)}$ | $SINR_1^{(2)}$ | $SINR_1^{(3)}$ | $SINR_1^{(4)}$ |
| $s_2$ | $SINR_2^{(1)}$ | $SINR_2^{(2)}$ | $SINR_2^{(3)}$ | $SINR_2^{(4)}$ |

Table 1 therefore illustrates the total of P×N SINR possibilities, as resulting from an SINR determination for each of the N bases as applied to each of the P symbol streams. Given Table 1, next block 84 determines, for each value of $V^{(n)}$, which of the two SINR values, corresponding to the two transmitted symbol streams, is the lower value (i.e., it takes the minimum of each value). For example, assume that the following Table 2 illustrates each such minima from Table 1:

TABLE 2

|  | $V^{(1)}$ | $V^{(2)}$ | $V^{(3)}$ | $V^{(4)}$ |
|---|---|---|---|---|
| minimum | $SINR_1^{(1)}$ | $SINR_1^{(2)}$ | $SINR_2^{(3)}$ | $SINR_2^{(4)}$ |

In the example of Table 2, therefore, the SINR corresponding to stream $s_1$ is lower for $V^{(1)}$ and $V^{(2)}$, while the SINR corresponding to stream $s_2$ is lower for $V^{(3)}$ and $V^{(4)}$. Finally, having made the minima determinations in Table 2, block 84 selects as optimum the value of $V^{(n)}$ that corresponds to the maximum, of those minima. For example, assume that $SINR_1^{(2)}$ is the largest value in Table 2; in response, block 84 identifies the respective basis $V^{(2)}$ as the optimum basis for use by transmitter 72. Consequently, block 84 causes receiver 74 to feed back an indication of $V^{(2)}$ to feedback decode block 78 of transmitter 72; in response, feedback decode block 78 provides $V^{(2)}$ to matrix multiplication block 76, which in response multiplies $V^{(2)}$ times future symbols to be transmitted, as described generally above with respect to transmitter 72. Thereafter, block 84 preferably repeats this process at later times, and at each such time an updated $V^{(n)}$ is therefore identified by receiver 74 and that identification is fed back to transmitter 72, thereby providing an adaptive process of selecting the optimum basis from the finite set of possible bases.

Having demonstrated one preferred methodology for optimizing SINR, note that various others may be ascertained and are included within the present inventive scope. For example, another approach is to choose the value of $V^{(n)}$ that minimizes the minimum mean square error. As another example, recall it is mentioned above that receiver 74 may be one of various types. For each of these different types of receivers, a closed form expression for its SINR is known in the art. Various different examples of such expressions are shown below.

As one example of an SINR expression arising from a type of receiver, for a linear zero forcing receiver in a case corresponding to two transmit antennas and Q receive antennas, its closed form SINR expression is defined for each of the two transmitted streams, thereby providing values $SINR_1$ and $SINR_2$, as shown in the following Equations 38 and 39:

$$SINR_1 = \rho h_1^H \left( I_Q - \frac{h_2 h_2^H}{\|h_2\|^2} \right) h_1 \qquad \text{Equation 38}$$

$$SINR_2 = \rho h_2^H \left( I_Q - \frac{h_1 h_1^H}{\|h_1\|^2} \right) h_2 \qquad \text{Equation 39}$$

in Equations 38 and 39, $I_Q$ is the identity matrix of dimension Q×Q, and $\rho$ is the normalized transmitted signal power defined according to the following Equation 40:

$$\rho = \frac{\varepsilon_s}{\sigma^2} \qquad \text{Equation 40}$$

where $\sigma^2$ is the square of the noise variance, $E|s_1|^2 = E|s_2|^2 = \varepsilon_s$.

As another example of an SINR expression arising from a type of receiver, for a linear MMSE receiver in a case corresponding to two transmit antennas and Q receive antennas, its closed form SINR expression is defined for each of the two transmitted streams, thereby providing values $SINR_1$ and $SINR_2$, as shown in the following Equations 41 and 42:

$$SINR_1 = \rho h_1^H \left( I_Q - \frac{h_2 h_2^H}{\|h_2\|^2 + \rho^{-1}} \right) h_1 \qquad \text{Equation 41}$$

-continued $$\text{SINR}_2 = \rho h_2^H \left( I_Q - \frac{h_1 h_1^H}{\|h_1\|^2 + \rho^{-1}} \right) h_2 \qquad \text{Equation 42}$$

As still another example of an SINR expression arising from a type of receiver, for an iterative zero forcing receiver in a case corresponding to two transmit antennas and Q receive antennas, its closed form SINR expression is defined for each of the two transmitted streams, thereby providing values $\text{SINR}_1$ and $\text{SINR}_2$, where $\text{SINR}_1$ is the same as for the linear zero forcing receiver shown above in Equation 38 and $\text{SINR}_2$ is shown in the following Equation 43:

$$\text{SINR}_2 = \rho \|h_2\|^2 \qquad \text{Equation 43}$$

These values of $\text{SINR}_1$ and $\text{SINR}_2$ assume that the first iteration is with respect to the first stream $s_1$. In contrast, if that first iteration were with respect to the second stream $s_2$, then $\text{SINR}_2$ would be the same as for the linear zero forcing receiver shown above in Equation 39 while $\text{SINR}_1$ would be as set forth in the following Equation 44:

$$\text{SINR}_1 = \rho \|h_1\|^2 \qquad \text{Equation 44}$$

As a final example of an SINR expression arising from a type of receiver, for an iterative MMSE receiver in a case corresponding to two transmit antennas and Q receive antennas, its closed form SINR expression is defined for each of the two transmitted streams, thereby providing values $\text{SINR}_1$ and $\text{SINR}_2$, where $\text{SINR}_1$ is the same as for the linear MMSE receiver shown above in Equation 41, while $\text{SINR}_2$ is shown in the previous Equation 43. These values of $\text{SINR}_1$ and $\text{SINR}_2$ assume that the first iteration is with respect to the first stream $s_1$. In contrast, if that first iteration were with respect to the second stream $s_2$, then $\text{SINR}_2$ would be the same as for the linear MMSE receiver shown above in Equation 42 while $\text{SINR}_1$ would be as set forth in the previous Equation 44.

In view of the expressions of the various Equations 38 through 44, or given a comparable SINR expression for a different type of receiver, any chosen manner of optimizing the SINR may be used to select the linear basis transformation matrix $V^{(n)}$ from the set $\{V^{(n)}\}_{n=1}^N$ and that corresponds to the optimized SINR. Additionally, note that signal-to-noise ratio ("SNR") is a special case of SINR; specifically, for some receivers, such as for receivers incorporating zero forcing detector methods, they are considered to completely eliminate interference and, hence, their performance is specified in terms of SNR, that is, by removing the interference component from SINR to yield SNR. For such a receiver, the present inventive teachings also may be applied, wherein the linear basis transformation matrix $V^{(n)}$ is selected that corresponds to the optimized SNR rather than SINR. Thereafter, the selected matrix is identified by receiver 74 to transmitter 72, as described above.

FIG. 4 illustrates an electrical block diagram of a double space time block coded transmit antenna diversity ("DSTTD") system 100 according to another preferred embodiment. Like FIG. 3, since FIG. 4 represents an electrical and functional block diagram, one skilled in the art may ascertain various technical manners of implementing system 100 into a combination of hardware and software, including the preferred used of a digital signal processor to include at least some of the illustrated blocks. Turning then to system 100, and by way of introduction, STTD technology in general is known in the art. Indeed, for further aspects that could be incorporated in such a system, the reader is invited to review the following two patent applications, both of which are hereby incorporated herein by reference: (i) U.S. patent application Ser. No. 09/578,004, filed May 24, 2000; and (ii) U.S. patent application Ser. No. 09/885,878, filed Jun. 20, 2001. In system 100, it includes a transmitter 102 and a receiver 104. In some respects, transmitter 102 and receiver 104 are comparable to transmitter 72 and receiver 74 of system 70 described earlier and, thus, to simplify the present discussion the comparable blocks are shown with a like reference identifier and are generally not discussed once more so as to simplify the remaining discussion. DSTTD system 100 is also a multiple antenna system with P transmit antennas and Q receive antennas, where in such a system Q can be larger than P; in the example of FIG. 4, therefore, P=4 so that transmit antennas $\text{TAT}_1''$ through $\text{TAT}_4''$ are shown, and Q is a larger number so that receive antennas $\text{RAT}_1''$ through $\text{RAT}_Q$ are shown.

Looking to transmitter 102, blocks 16' through 22' are described earlier, and block 24'' is similar to block 24' described earlier and is further addressed later. Coupled between block 22' and block 24'' are two STTD encoders $105_1$ an $105_2$ and, hence, the reference to system 100 as a "double" STTD system. Each STTD encoder $105_1$ and $105_2$ has a corresponding input $105i_1$ and $105i_2$, along which it receives a block of two symbols. For the sake of example and convention, STTD encoder $105_1$ receives symbols $s_{1,1}$ and $s_{1,2}$, while STTD encoder $105_2$ receives symbols $s_{2,1}$ and $s_{2,2}$. Each STTD encoder $105_1$ and $105_2$ provides two outputs, where a first output provides the same input symbols as received at the encoder input while a second output provides, by way of example, the complex conjugates of the input symbols, wherein those conjugates are output in a reversed order relative to how they were input and the second symbol is a negative value relative to its value as an input. For example, with respect to encoder $105_1$, its first output provides sn, and $s_{1,2}$, while its second output provides $s_{1,2}*$ and $-s_{1,1}*$, where the superscript asterisk is intended to indicate the conjugate of the symbol. Similarly, with respect to encoder $105_2$, its first output provides $s_{2,1}$ and $s_{2,2}$, while its second output provides $s_{2,2}*$ and $-s_{2,1}*$.

The outputs of STTD encoders $105_1$ and $105_2$ are connected to a matrix multiplication block 107. Matrix multiplication block 107 multiplies those outputs times a linear basis transformation matrix $V^{(n)}$, where $V^{(n)}$ is in general developed in the manner described above with respect to system 70, with two exceptions. First; in system 100, $V^{(n)}$ is a 4×4 matrix because P=4. Second, because system 100 is an STTD-type system rather than a MIMO-type system, then the set $\{V^{(n)}\}_{n=1}^N$ may include matrices differing from those preferred for a MIMO system. These differences are further explored later. Also as detailed below, while $V^{(n)}$ is a 4×4 matrix in connection with system 100 which therefore includes 16 values, in the preferred embodiment the sets of $\{V^{(n)}\}_{n=1}^N$ include matrices including values of zero and non-zero, where at most four unique non-zero values are included in each matrix $V^{(n)}$ (although some of the non-zero values may be used more than once in the same matrix) Thus, these four values may be represented in the 2×2 simplified matrix VS shown in the following Equation 45:

$$VS = \begin{bmatrix} vs_{1,1} & vs_{2,1} \\ vs_{1,2} & vs_{2,2} \end{bmatrix} \qquad \text{Equation 45}$$

Completing the connections within system 100, the outputs of matrix multiplication block 107 are connected to a spreader 24'''. Spreader 24''' is shown with dashed lines for the same reason that such lines were used above with respect to spreader 24" of system 70, namely, because such a function is preferred only if system 100 incorporates CDMA communications, whereas if it incorporates TDMA communications then spreader 24''' is eliminated. The outputs of spreader 24''' in a CDMA embodiment, or of matrix multiplication block 107 in a TDMA embodiment, are connected to transmit antennas $TAT_1"$ through $TAT_4"$ (via an analog-to-digital interface, not shown).

Turning to receiver 104, it includes receive antennas $RAT_1"$ through $RAT_Q$ (connected to an analog-to-digital interface, not shown), where in a CDMA embodiment these antennas are connected to a despreader 32", and in a TDMA embodiment despreader 32" is eliminated. Either the despread signal in the CDMA embodiment or the antenna signal in the TDMA embodiment provides a signal block R. In the CDMA embodiment, block R can be written as in the following Equation 46:

$$R = (vs_{1,1}[h_1h_2] + vs_{1,2}[h_3h_4])S_1 + (vs_{2,1}[h_1h_2] + vs_{2,2}[h_3h_4])S_2 + W = [\hat{h}_{1,1}\hat{h}_{1,2}]S_1 + [\hat{h}_{2,1}\hat{h}_{2,2}]S_2 + W \quad \text{Equation 46}$$

where $S_1$ and $S_2$ are the 2×2 STTD-encoded data blocks for $\{s_{1,1}\ s_{1,2}\}$ and $\{s_{2,1}\ s_{2,2}\}$, where W is additive white noise, and where the following Equations 47 through 50 relate to the channel estimates:

$$\hat{h}_{1,1} = vs_{1,1}h_1 + vs_{1,2}h_3 \quad \text{Equation 47}$$

$$\hat{h}_{1,2} = vs_{1,1}h_2 + vs_{1,2}h_4 \quad \text{Equation 48}$$

$$\hat{h}_{2,1} = vs_{2,1}h_1 + vs_{2,2}h_3 \quad \text{Equation 49}$$

$$\hat{h}_{2,2} = vs_{2,1}h_2 + vs_{2,2}h_4 \quad \text{Equation 50}$$

The pilot symbol signals are shown as output from despreader 32" to a channel estimator 82', where as was the case for system 70 this illustration implies that the pilot symbols are spread, where the spreading will, be with a different code than was used for the data symbols when the pilot symbols are in a separate channel and with the same code when the data and pilot symbols share the same channel. In any event, given the known values of the pilot symbols and the signals as received, channel estimator 82' determines the value of $\hat{H}$, as arising from Equations 47 through 50, above, and the values of that matrix are provided to STTD decoders 110$_1$ and 110$_2$. Each of decoders 110$_1$ and 110$_2$ performs the combining and block decoding for each data stream to generate sufficient statistics for symbol detection. In this regard, the channel estimate, $\hat{H}$, and the basis selected for the previous transmission, $V^{(n)}(t-1)$, are used for combining. The current channel estimate, $\hat{H}$, is then used by block 84' for selecting the basis $V^{(n)}$ from a set of bases, after which an identification of the selected basis $V^{(n)}$ is fed back to feedback decode block 78' of transmitter 102. Additionally, the outputs of decoders 110$_1$ and 110$_2$ are connected to a joint interference cancellation and detector block 88', which may implement any one of the various techniques described above with respect to the comparable block 88 in FIG. 3. Here again, note that the operation of block 88' is a linear function, as is the operation of STTD decoders 110$_1$ and 110$_2$. Accordingly, the order of these two operations may be reversed and, thus, the ordering as shown in FIG. 4 is only by way of example. In any event, due to the operation of block 88', the effect of inter-stream interference from the signals is suppressed with the result coupled to a parallel-to-serial connector 34". Parallel-to-serial connector 34" converts the P/2 streams back to a single stream. Lastly, this single stream is connected to blocks 36''', 38''', and 40''', which operate in a comparable manner as described earlier with respect to blocks 36", 38", and 40", respectively, of system 70 in FIG. 3.

Returning now to discuss $V^{(n)}$ basis selector block 84', it operates in a comparable manner as described above with respect to block 84 of system 70 in that it selects an optimum linear basis transformation matrix $V^{(n)}$ from a finite set of those bases, where it uses a certain criterion or criteria (e.g., maximizing SINR or SNR, joint cancellation and detector type) to select that optimum basis. However, two notable changes exist for system 100. First, since 4×4 matrices are involved due to the double STTD encoding, then the precise format of Equations 29 and 35 are not used. Second, since system 100 is based on STTD communications, then an additional permutation approach is usable for establishing the finite set of liner basis transformation matrices. Each of these approaches is detailed below.

One set of linear basis transformation matrices from which $V^{(n)}$ basis selector block 84' may select may be derived from Equation 29, by defining a Kronecker product of the matrix of Equation 29 with the identity matrix as shown in the following Equation 51:

$$V^{(n)} = \begin{bmatrix} \cos\theta_n & -\sin\theta_n \\ \sin\theta_n & \cos\theta_n \end{bmatrix} \otimes \begin{bmatrix} 1 & 0 \\ 0 & 1 \end{bmatrix} = \begin{bmatrix} \cos\theta_n & 0 & -\sin\theta_n & 0 \\ 0 & \cos\theta_n & 0 & -\sin\theta_n \\ \sin\theta_n & 0 & \cos\theta_n & 0 \\ 0 & \sin\theta_n & 0 & \cos\theta_n \end{bmatrix} \quad \text{Equation 51}$$

where $\theta_n$ is again defined by Equation 30. Looking at the 4×4 result of Equation 51, it may be seen that only $\theta_n$ is at issue. Thus, according to Equation 30, again receiver 104 need only transmit n back to transmitter 102 in order to identify which matrix $V^{(n)}$ provides the optimum SINR (or SNR); accordingly, only $\log_2(N)$ bits are required in the feedback channel to achieve this communication.

Another set of linear basis transformation matrices from which $V^{(n)}$ basis selector block 84' may select may be derived from Equation 35, again by defining a Kronecker product, but this time between the matrix of Equation 35 with the identity matrix as shown in the following Equation 52:

$$V^{(n)} = \begin{bmatrix} \cos\theta_n e^{j\phi_m} & -\sin\theta_n \\ \sin\theta_n & \cos\theta_n \end{bmatrix} \otimes \begin{bmatrix} 1 & 0 \\ 0 & 1 \end{bmatrix} = \begin{bmatrix} \cos\theta_n e^{j\phi_m} & 0 & -\sin\theta_n e^{j\phi_m} & 0 \\ 0 & \cos\theta_n e^{j\phi_m} & 0 & -\sin\theta_n e^{j\phi_m} \\ \sin\theta_n & 0 & \cos\theta_n & 0 \\ 0 & \sin\theta_n & 0 & \cos\theta_n \end{bmatrix} \quad \text{Equation 52}$$

where $\theta_n$ is defined by Equation 36 and where $\phi_m$ is defined by Equation 37. Thus, according to Equation 52, receiver 104 need only transmit n and m back to transmitter 102 in order to identify which matrix $V^{(n)}$ provides the optimum SINR (or SNR); accordingly, only $\log_2(N) + \log_2(M)$ bits are required in the feedback channel to achieve this communication.

Another set of linear basis transformation matrices from which $V^{(n)}$ basis selector block 84', and which arises due to the use of STTD encoding, is the use of a set of permutation matrices. Specifically, a set of permutation matrices may be defined based on the number of transmit antennas, P, where each matrix has P×P elements and is either the identity matrix I or an orthogonal permutation of that matrix, and the number N of permutation matrices is shown in the following Equation 53 and is defined for P=2:

$$N = \frac{P!}{2!\left(\frac{P}{2}\right)} = \frac{4!}{2!2} = 6 \qquad \text{Equation 53}$$

Thus, from Equation 53, such six matrices are shown in the following Equations 54 through 59:

$$\Pi_{1234} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \qquad \text{Equation 54}$$

$$\Pi_{1234} = \begin{bmatrix} 1 & 0 & 0 & 0 \\ 0 & 1 & 0 & 0 \\ 0 & 0 & 0 & 1 \\ 0 & 0 & 1 & 0 \end{bmatrix} \qquad \text{Equation 55}$$

$$\Pi_{1234} = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \qquad \text{Equation 56}$$

$$\Pi_{1234} = \begin{bmatrix} 1 & 0 & 0 & 0 \\ 0 & 0 & 0 & 1 \\ 0 & 1 & 0 & 0 \\ 0 & 0 & 1 & 0 \end{bmatrix} \qquad \text{Equation 57}$$

$$\Pi_{1234} = \begin{bmatrix} 1 & 0 & 0 & 0 \\ 0 & 0 & 1 & 0 \\ 0 & 0 & 0 & 1 \\ 0 & 1 & 0 & 0 \end{bmatrix} \qquad \text{Equation 58}$$

$$\Pi_{1234} = \begin{bmatrix} 1 & 0 & 0 & 0 \\ 0 & 0 & 0 & 1 \\ 0 & 0 & 1 & 0 \\ 0 & 1 & 0 & 0 \end{bmatrix} \qquad \text{Equation 59}$$

From Equations 54 through 59, it may be seen that in the example of system 100 of FIG. 4, the set $\{V^{(n)}\}_{n=1}^{N}$ of basis matrices consists of a total of only six matrices. Once more, therefore, basis selector block 84' identifies the one of those six matrices that meets a certain criterion or criteria and indicates that optimum matrix to transmitter 102.

Equations 51 through 59 have demonstrated that system 100 also may implement various different sets of liner basis transformation matrices in order to improve signal communications between transmitter 102 and receiver 104. Various additional observations also are noteworthy. As one observation, note that still other finite sets of such matrices may be developed by one skilled in the art. For example, a set consisting of general 4×4 unitary rotation matrices may be ascertained. As another observation, recall that earlier in connection with Equation 39 it was stated that at most four unique non-zero values are included in each matrix $V^{(n)}$. This statement now may be confirmed by examining the matrices in Equations 51 and 52. For example, with respect to Equation 51, its 4×4 matrix includes only the following three non-zero values: (1) $\cos \theta_n$; (2) $-\sin \theta_n$; and (3) $\sin \theta_n$. As another example, with respect to Equation 52, its 4×4 matrix includes at most only the following four non-zero values: (1) $\cos \theta_n e^{j\Phi_n}$; (2) $-\sin \theta_n$; (3) $\sin \theta_n$; and (4) $\cos \theta_n$. Due to the fact that less than sixteen non-zero values are implemented in these as well as other example, then the number of bits required to feedback an identification of a selected matrix $V^{(n)}$ is less than might be required if sixteen different non-zero values were used.

From the above, it may be appreciated that the above embodiments provide a wireless communications systems having a transmitter and a receiver, both with multiple antennas. Various embodiments are described by way of example, wherein the transmitter communicates independent symbol stream, and prior to transmission, those streams are transformed using a linear basis; preferably the linear basis is selected by the receiver from a finite set of different bases and an identification of the selected basis, along with any parameter(s) corresponding to that basis, are communicated (i.e., fed back) from the receiver to the transmitter. Given the preceding, various benefits arise over the prior art as well as the above-discussed proposed eigenmode system. For example, recalling that the full channel eigenmode scheme would require $16 \times N_Q$ feedback bits, the preferred embodiment described herein in some approaches requires only $\log_2(N)$ feedback bits, and typically N should not exceed 16 so that therefore the number of feedback bits may be considerably lower than the eigenmode system. In addition, the preferred embodiments permit interstream interference which is subsequently accommodated using one of various joint detection methodologies. As still another benefit as compared to the largest eigenmode scheme, for a given modulation scheme the preferred embodiments allow higher data rates. Also, for a given data rate, the preferred embodiments allow the use of lower order constellation. Still further, the preferred embodiments may favor well in comparison to conventional closed-loop transmit diversity which requires $3 \times N_Q$ feedback coefficients. Still further, as compared to open loop systems, the preferred embodiments use channel information at the channel at the transmitter, which results in significant performance improvement, especially in slow fading channels. As a final benefit, the preceding teachings may be applied to various wireless system given the many variations described herein and, thus, while the present embodiments have been described in detail, various substitutions, modifications or alterations could be made to the descriptions set forth above without departing from the inventive scope which is defined by the following claims.

The invention claimed is:

1. A method of processing signals in a communication circuit, comprising:
   receiving a plurality of signal streams on a plurality of receive antennas from a plurality of transmit antennas coupled to a transmitter;
   producing a channel estimate in response to a predetermined signal on the plurality of received signal streams;
   selecting a matrix from a finite set of matrices in response to the produced channel estimate; and
   multiplying the plurality of received signal streams by a conjugate of a transpose of the produced channel estimate and by a conjugate of a transpose of the selected matrix.

2. A method as in claim 1, further comprising despreading the plurality of received signal streams in response to a code.

3. A method as in claim 1, further comprising removing interference from the plurality of received signal stems.

4. A method as in claim CO, further comprising;
identifying the selected matrix to a remote receiver; and
calculating a product of the produced channel estimate and the selected matrix prior to the multiplying of the plurality of received signal streams by the conjugate of the transpose of the produced channel estimate and by the conjugate of the transpose of the selected matrix.

5. A method as in claim 1, further comprising:
converting a group of the multiplied plurality of signal streams to a serial signal stream;
demodulating the serial signal stream;
deinterleaving the demodulated serial signal stream; and
decoding the deinterleaved serial signal stream.

6. A method as in claim 1, wherein the plurality of received signal streams comprise at least one pilot symbol.

7. A method as in claim 1, wherein the selected matrix is a linear basis transformation matrix.

8. A method as in claim 1, further comprising receiving the plurality of signal streams from a plurality of remote transmit antennas, wherein the plurality of signal streams are encoded differently for each respective antenna of the plurality of transmit antennas.

9. An apparatus, comprising;
circuitry for receiving a plurality of signal streams on a plurality of receive antennas from a plurality of transmit antennas coupled to a transmitter;
circuitry for producing a channel estimate in response to a predetermined signal on the plurality of received signal streams;
circuitry for selecting a matrix from a finite set of matrices in response to the produced channel estimate; and
circuitry for multiplying the plurality of received signal streams by a conjugate of a transpose of the produced channel estimate and by a conjugate of a transpose of the selected matrix.

10. The apparatus as in claim 9, further comprising circuitry for despreading the plurality of received signal streams in response to a code.

11. The apparatus as in claim 9, further comprising circuitry for removing interference from the plurality of received signal streams.

12. The apparatus as in claim 9, further comprising:
circuitry for identifying the selected matrix to a remote receiver; and
circuitry for calculating a product of the produced channel estimate and the selected matrix prior to the multiplying of the plurality of received signal streams by the conjugate of the transpose of the produced channel estimate and by the conjugate of the transpose of the selected matrix.

13. The apparatus as in claim 9, further comprising:
circuitry for converting a group of the multiplied plurality of received signal streams to a serial signal stream;
circuitry for demodulating the serial signal stream;
circuitry for deinterleaving the demodulated serial signal stream; and
circuitry for decoding the deinterleaved serial signal stream.

14. The apparatus as in claim 9, wherein the predetermined signal stream comprises at least one pilot symbol.

15. The apparatus as in claim 9, wherein the selected matrix is a linear basis transformation matrix.

16. The apparatus as in claim 9, further comprising receiving the plurality of signal streams from a plurality of remote transmit antennas, wherein the plurality of signal streams are encoded differently for each respective antenna of the plurality of transmit antennas.

17. An apparatus, comprising:
circuitry for receiving a plurality of signal streams on a plurality of receive antennas;
circuitry for producing a channel estimate in response to a predetermined signal on the plurality of received signal streams;
circuitry for selecting a matrix from a finite set of matrices in response to the produced channel estimate; and
circuitry for multiplying the plurality of received signal streams by a conjugate of a transpose of the produced channel estimate and by a conjugate of a transpose of the selected matrix.

* * * * *